(12) United States Patent
Kim

(10) Patent No.: US 7,136,366 B2
(45) Date of Patent: *Nov. 14, 2006

(54) METHOD AND SYSTEM FOR PROVIDING INTER-FREQUENCY HANDOFF IN A TELEPHONE SYSTEM

(75) Inventor: Jong-Youn Kim, Kyungki-do (KR)

(73) Assignee: LG Electronics Inc., Seoul (KR)

( * ) Notice: Subject to any disclaimer, the term of this patent is extended or adjusted under 35 U.S.C. 154(b) by 873 days.

This patent is subject to a terminal disclaimer.

(21) Appl. No.: 10/017,417

(22) Filed: Dec. 18, 2001

(65) Prior Publication Data

US 2002/0041577 A1    Apr. 11, 2002

Related U.S. Application Data

(63) Continuation of application No. 09/020,040, filed on Feb. 6, 1998, now Pat. No. 6,339,590.

(30) Foreign Application Priority Data

Nov. 6, 1997    (KR) ............................... 1997-58539

(51) Int. Cl.
  *H04Q 7/00*    (2006.01)
  *H04Q 7/20*    (2006.01)
(52) U.S. Cl. .................... 370/331; 455/436
(58) Field of Classification Search ............ 370/331, 370/468, 346, 333, 335; 455/436
  See application file for complete search history.

(56) References Cited

U.S. PATENT DOCUMENTS

| 4,901,307 | A |   | 2/1990  | Gilhousen et al. ........... 370/18 |
|-----------|---|---|---------|------------------------------------|
| 5,056,109 | A | * | 10/1991 | Gilhousen et al. ........... 370/342|
| 5,101,501 | A |   | 3/1992  | Gilhousen et al. ........... 455/33 |
| 5,103,459 | A | * | 4/1992  | Gilhousen et al. ........... 370/206|
| 5,109,390 | A | * | 4/1992  | Gilhousen et al. ........... 370/335|
| 5,267,261 | A | * | 11/1993 | Blakeney et al. ........... 370/332 |
| 5,416,797 | A | * | 5/1995  | Gilhousen et al. ........... 370/209|
| 5,533,104 | A | * | 7/1996  | Weiss et al. .................. 379/70|

(Continued)

FOREIGN PATENT DOCUMENTS

GB    2 297 460 A    7/1996

(Continued)

OTHER PUBLICATIONS

Copy of Japanese Office Action.

*Primary Examiner*—Alpus H. Hsu
(74) *Attorney, Agent, or Firm*—Fleshner & Kim, LLP

(57) ABSTRACT

In the preferred embodiment, the transmission length of the non-full rate frame is shortened frame in order for the mobile terminal 100 to monitor other frequencies with a single receiver. Modulated symbols of non-full rate frame are transmitted with reduced repetition maintaining the sum of repeated symbol energy. Generally, for $1/n$ ($n=2,4,8$) length transmission, $1/m$ ($m \geq n$) rate frame repeated $m/n$ times and transmitted with $n/m$ symbol energy of the full rate frame. The system may use rate limitation to generate a non-full rate frame. A position of the transmitted symbols may be randomized by a mobile specific predetermined random code to minimize interference between terminals different from each other. For intensive frequency scanning and synchronization signal transmission, non-transmitting period can be assigned for successive frames of some interval. For $1/n$ ($n=2,4,8$) length successive transmission, the starting position of the transmitted symbols are staggered by $1/n$ frame time in each frame. If there is no part of the frame to be staggered, the starting position is the beginning of the frame. Such implementation minimizes guard time overhead for frequency switching and resynchronization.

41 Claims, 5 Drawing Sheets

U.S. PATENT DOCUMENTS

| | | | | |
|---|---|---|---|---|
| 5,590,177 A | * | 12/1996 | Vilmur et al. | 455/436 |
| 5,594,718 A | * | 1/1997 | Weaver et al. | 370/331 |
| 5,634,192 A | * | 5/1997 | Meche et al. | 455/437 |
| 5,649,000 A | * | 7/1997 | Lee et al. | 455/436 |
| 5,682,380 A | * | 10/1997 | Park et al. | 370/331 |
| 5,722,072 A | * | 2/1998 | Crichton et al. | 455/437 |
| 5,828,661 A | | 10/1998 | Weaver, Jr. et al. | 370/331 |
| 5,841,806 A | * | 11/1998 | Gilhousen et al. | 375/146 |
| 5,848,063 A | * | 12/1998 | Weaver et al. | 370/331 |
| 5,883,899 A | | 3/1999 | Dahlman et al. | 370/468 |
| 5,937,019 A | | 8/1999 | Padovani | 375/358 |
| 5,999,816 A | | 12/1999 | Tiedemann, Jr. et al. | 455/437 |
| 6,078,570 A | | 6/2000 | Czaja et al. | 370/331 |
| 6,205,190 B1 | * | 3/2001 | Antonio et al. | 375/346 |
| 6,339,590 B1 | * | 1/2002 | Kim | 370/331 |
| 6,665,281 B1 | * | 12/2003 | Kim | 370/331 |

FOREIGN PATENT DOCUMENTS

| | | |
|---|---|---|
| JP | 07-288858 | 10/1995 |
| WO | WO 97/40593 | 10/1997 |

* cited by examiner

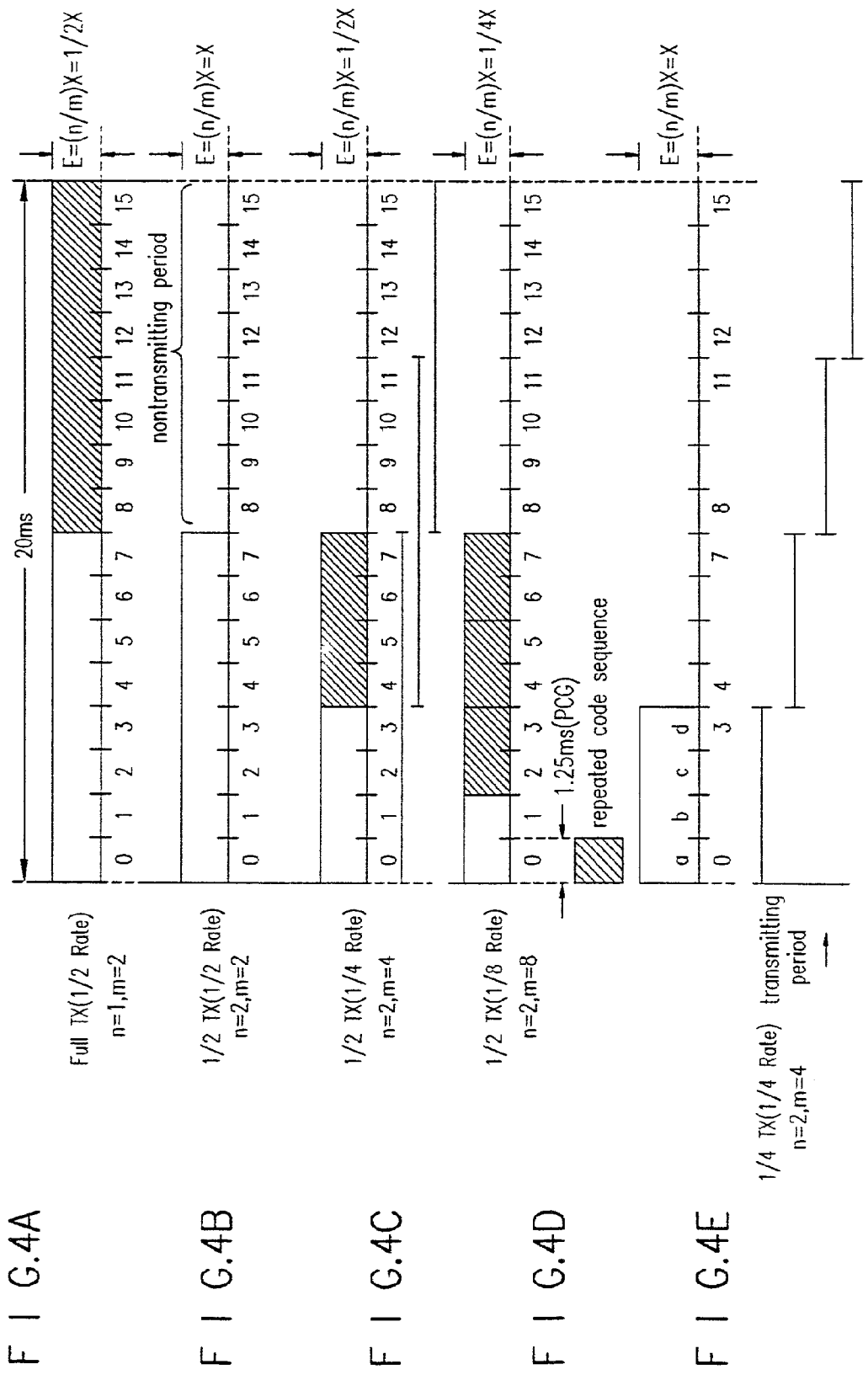

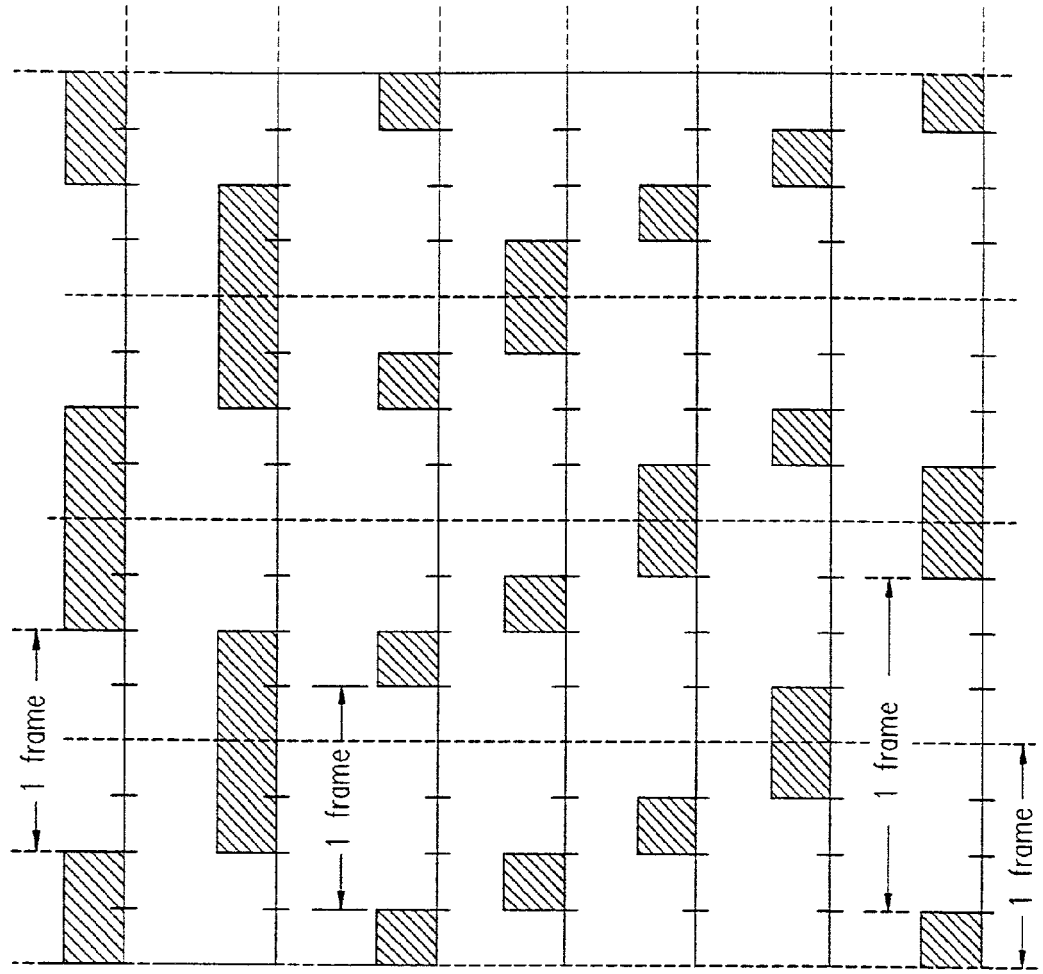

METHOD AND SYSTEM FOR PROVIDING INTER-FREQUENCY HANDOFF IN A TELEPHONE SYSTEM

The application is a Continuation of application Ser. No. 09/020,040 filed Feb. 6, 1998, now U.S. Pat. No. 6,339,590.

BACKGROUND OF THE INVENTION

1. Field of the Invention

The present invention relates to a telephone system, and more particularly, to a method for controlling an inter-frequency handoff in a code division multiple access (CDMA) cellular telephone system.

2. Background of the Related Art

Generally, a cellular telephone system includes a service area which is divided into a plurality of cells. Each cell provides many mobile terminals with a radio communication service through a base station. To maintain high quality communication when the mobile terminal moves between cells, a handoff, which changes a communication link or channel with one base station to another base station, must be timely established. Therefore, the mobile terminal has to be able to measure the quality of signals from other peripheral base stations during communication, and the base station system is provided with the quality of signal information to timely perform the handoff. Such a hand off is referred to as a mobile-assisted handoff.

In particular, the CDMA system can perform the communication while using the same frequency and varying an offset of a common pseudo-random code that spreads bandwidth of transmitting signal. The CDMA system has a first digital receiver, which Is referred to a searcher for searching a different CDMA signal of the same frequency, and a second digital receiver for demodulating the data. Typically, the CDMA system uses a plurality of second digital receivers, which are referred to "RAKE" receiver, to receive the data transmitted via multiple path. Accordingly, the mobile terminal can measure the quality of a different base station signal of the same frequency during the communication. In the CDMA method, the transmission rate of the data can be varied in multilevel, and the overall radio capacity within the transmission frequency can be increased by reducing an interference between different channels, which use the same frequency as the transmission rate is reduced. For example, voice data has an information amount variable with the time, and half of the communication is used for listening, i.e., receiving voice data, and the rest is used for speaking, i.e., transmitting voice data. If a variable rate transmission is used, a fifty percent or more increase in capacity may be produced.

The system capacity in the cellular telephone system may be increased by reducing the size of the cell to increase the number of the cells within the service area. However, if the size of the cell is reduced, the handoff is too often occurred generated when moving at a high speed. Hence, the base station has difficulty in properly processing the handoff.

Accordingly, a hierarchical cell structure or a layered cell structure is used, where a macro-cell of a larger size is placed upon a micro-cell of smaller size which serves the terminal moving at high-speed, is placed. In this cell structure, the handoff between the micro-cell and macro-cell according to a moving speed of the terminal, as well as the handoff between macro-cells, has to be provided.

In the hierarchical cell structure, the signal strength of the base station of the macro-cell may be much larger than that of the base station of the micro-cell, and therefore various problems, such as cocktail party effect, egg phenomenon, etc., may occur even in the CDMA system. To provide the hierarchical cell structure on different frequencies, in the CDMA system has to provide a (mobile-assisted) inter-frequency handoff.

To perform the (mobile-assisted) inter-frequency mobile-assisted handoff, the mobile terminal has to be able to receive the base station signal of different frequency during the communication and therefore, it has to be provided with an additional radio frequency RF receiver, or alternatively, the mobile terminal has to use a single RF receiver in a time-division multiplexing (TDM) method for receiving the signal of a different frequency.

The above-mentioned related CDMA cellular telephone system continuously transmits a forward signal from the base station toward she mobile terminal, the mobile terminal may have two or more RF receivers for receiving the base station signal of different frequencies during the communication. However, this method is undesirable since the cost and size of the mobile terminal increase.

For the alternate method in the CDMA system, the time period where the mobile terminal breaks a part of reception signal and receives the signal of the different frequency may be used for providing the inter-frequency handoff with a single RF receiver. However, such a method may cause the degradation of the communication quality and the communication may be dropped as the required signaling data is not received.

SUMMARY OF THE INVENTION

Accordingly, the present invention is directed to substantially obviate the problems of the related art.

An object of the present invention is to provide a method for providing inter-frequency handoff in a code division multiple access cellular telephone system capable of maintaining an excellent communication quality.

Another object of the present invention is to rapidly establish an inter-frequency handoff between a mobile terminal and a peripheral base station as the mobile terminal searches a frequency of the other base station or transmits searched information.

A further object of the present invention is to allow inter-frequency handoff without using dual transceivers.

To achieve these and other advantages and in accordance with the purpose of the present invention, as embodied and broadly described, a method for providing an inter-frequency handoff in a code division multiple access cellular telephone system comprises the steps of: forming a non-transmitting period in a transmission frame by controlling the repeat times of a transmission symbol in a frame and a position or form of a transmitting period with a variable rate characteristic of a transmission signal; controlling an energy transmission level of the signal reconstructed through the aforesaid step in inverse proportion to the repeat times to transmit it; and searching a base station signal of a different frequency through a period where a signal of the frame transmitted through the aforesaid step is not transmitted, or transmitting a signal to the base station of the different frequency, by a mobile terminal.

The present invention can be achieved in parts or in a whole by a method of performing a handoff in a telephone system comprising the steps of: modulating data to a prescribed energy level of a frame unit by controlling repeat times of a symbol; inserting a searching period into the modulated frame to reconstruct the modulated frame as a transmission frame; and searching a frequency information of a station with the transmission frame to perform a handoff.

The present invention can be achieved in parts or in a whole by a method for providing a handoff in a telephone system comprising the steps of: modulating a band into a modulated frame having a repeated frame period by varying an energy transmission level based on a full rate frame; forming a non-transmitting period to the modulated frame and reconstructing a repeat transmission frame by controlling a number of repetition of the energy level; and searching frequency information of a peripheral base station with the transmission frame to perform a handoff and transmitting the searched information to a transmitter of a base station.

The present invention can be achieved in parts or in a whole by a method for providing a handoff in a telephone system comprising the steps of: forming a non-transmitting period in a transmission frame by controlling a number of repetitions of a transmission symbol in a frame and at least one of a position and form of a transmitting period with a variable rate characteristic of the transmission frame; controlling an energy level of the transmission symbol by an inverse proportion of the number of repetitions; and searching a base station signal of a different frequency during the non-transmitting period; or transmitting a signal to the base station of the different frequency, by a mobile terminal.

The present invention can be achieved in parts or in a whole by a telephone system comprising: a station that modulates data into a transmission frame having an energy level based on an inverse proportion of a number of repetitions of a transmission symbol, and at least one of a position and form of a transmitting period with a variable rate characteristic of the transmission frame, the station forming a non-transmitting period based on the number of repetitions as a searching period; and a terminal that searches frequency information during the searching period and transmits the searched frequency information to the station.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

BRIEF DESCRIPTION OF THE DRAWINGS

The invention will be described in detail with reference to the following drawings in which like reference numerals refer to like elements wherein:

FIGS. 4A to 4E are transmission timing diagrams applied to a method for providing an inter-frequency handoff in accordance with a preferred embodiment of the present invention; and FIGS. 5A to 5G are timing diagrams showing a continuous frequency searching period upon a control of the inter-frequency handoff in accordance with one of the preferred embodiment.

DETAILED DESCRIPTION OF PREFERRED EMBODIMENTS

FIGS. 1A to 1D and FIGS. 2A to 2D, respectively, show a timing diagram in accordance with a signal transmission of a variable rate used in a code division multiple access CDMA cellular telephone system of "IS-95" style (see U.S. Pat. No. 5,416,797). FIGS. 1A to 1D are applied to a method of varying transmission energy, and FIGS. 2A to 2D is applied to a method varying the transmission time.

In other words, FIGS. 1A to 1D are signal transmission timing diagrams of a forward link (voice channel) transmitted from a base station to a mobile terminal, and FIGS. 2A to 2D are signal transmission timing diagrams of a reverse link (voice channel) transmitted from the mobile terminal to the base station.

A transmission frame of the voice channel transmitted from the base station is divided into sixteen subframes, and is transmitted to the mobile terminal as a variable rate of four levels, such as a full rate (FIG. 1A), a half ($1/2$) rate (FIG. 1B), a quarter ($1/4$) rate (FIG. 1C) and an eighth ($1/8$) rate (FIG. 1D) Then, if the data rate is reduced to $1/n$ (herein, n is 2, 4 and 8), the number of bit per the frame of the transmission data is accordingly reduced and therefore, transmission data may be transmitted by a repetition of n times to keep transmission data rate constant.

If a transmission party repeatedly transmits each symbol of transmission data, a reception party combines the repeated symbols to achieve time diversity. The symbol is repeatedly transmitted at the different time and thereby, the transmission symbol can be correctly demodulated although parts of the repeated symbols are corrupted. The repetition is performed after a sequence or transmission data is all transmitted so that each repeated symbol is transmitted with enough time distance for maximizing the effect of the time diversity.

With reference to FIGS. 2A to 2D, the transmission frame of voice information transmitted from the base station is distributed into set random patterns in a transmission/reception period to be transmitted. For example, in case of FIG. 2A, all frames are transmitted. In case of $1/2$ rate shown in FIG. 2B, any one of two subframes is transmitted, and in case of $1/4$ rate of FIG. 2C, any one of four subframes is transmitted. In case of $1/8$ rate of FIG. 2D, any one of eight subframes is selected to be transmitted to the receiver of the terminal in the random pattern.

Figure 3:
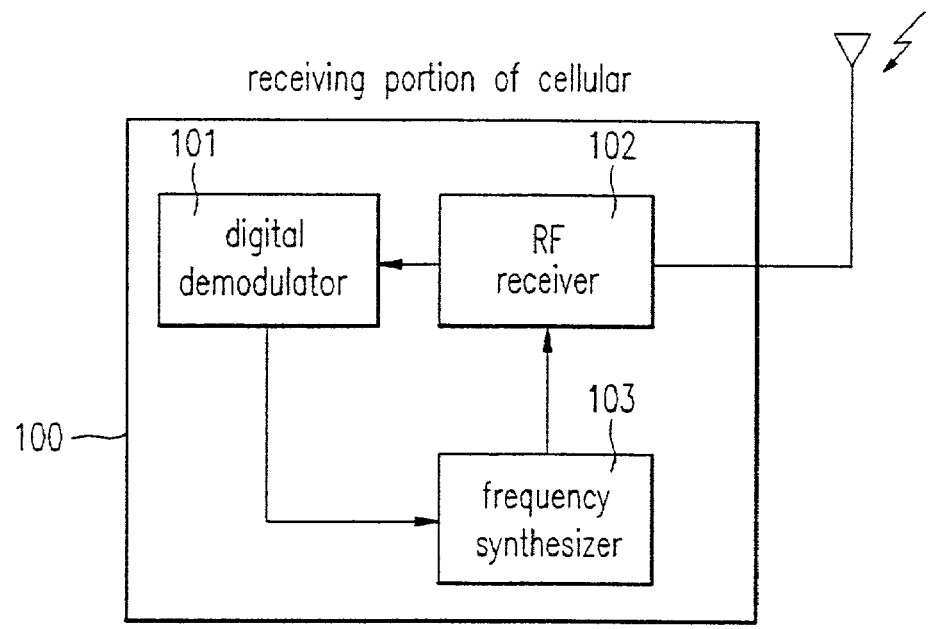
FIG. 3 is a block diagram showing a preferred embodiment of the CDMA cellular telephone system.
Figure 3:
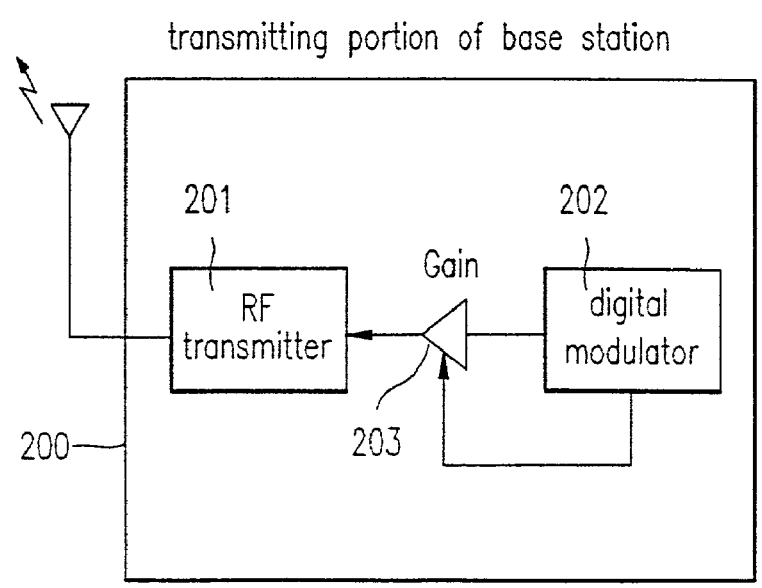

FIG. 3 is a block diagram showing a transceiver applied to the method of controlling the inter-frequency handoff in the CDMA cellular telephone system in accordance with the present invention. With reference to FIG. 3, an inter-frequency handoff transceiver in the CDMA cellular telephone system is comprised of a receiving portion 100 of the mobile terminal and a transmitting portion 200 of a base station.

The receiving portion 100 of the mobile terminal includes an RF receiver 102 receiving a radio signal selected in the radio signals transmitted from the transmitting portion 200 of the base station; a digital demodulator 101 demodulating the radio signal to an original signal; and a frequency synthesizer 103 generating frequency so that the RF receiver 102 may selectively receive any one of the radio signals.

The transmitting portion 200 of the base station includes a digital modulator 202 forming the transmission frame of data in a frame unit and converting each bit to a modulation symbol; a gain control element 203 controlling an energy level of the modulated transmission symbol by n/m; and an RF transmitter 201 varying and amplifying a frequency of the gain controlled radio signal to transmit it to an outside through an antenna.

In the preferred embodiment, the transmission length of the non-full rate frame is shortened in order for the mobile terminal 100 to monitor other frequencies with a single receiver. Modulated symbols of non-full rate frame are transmitted with reduced repetition maintaining the sum of repeated symbol energy. Generally, for 1/n (n=2,4,8) length transmission, 1/m (m>n) rate frame is repeated m/n times and transmitted with n/m symbol energy of the full rate frame. A frame of other channels except voice channel to a mobile terminal is not transmitted during the frame having a non-transmitting period. The system may use rate limitation to generate a non-full rate frame.

FIG. 4A illustrates a full (n=1) transmission at ½ (m=2) rate frame with two (m/n=2/1) time repetition. FIGS. 4B–4D illustrate ½ transmission (n=2) for ½ (m=2) rate frame, ¼ (m=4) rate frame and ⅛ (m=8) rate frame. As shown in FIG. 4B, the ½ rate frame is transmitted without repetition (m/n=1) with the same symbol energy of the full rate frame. In FIG. 4C, the ¼ rate frame is repeated only two (m/n=4/2=2) times and transmitted with ½ (n/m=2/4) times symbol energy x of the full rate frame. The ⅛ rate frame is repeated only four (m/n=8/2) times and transmitted with ¼ (n/m=2/8) times symbol energy x (FIG. 4D). FIG. 4E illustrates ¼ (n=4) transmission at ¼ (m=4) rate frame without repetition (m/n=4/4) with the symbol energy of the full rate frame.

Figure 1A:
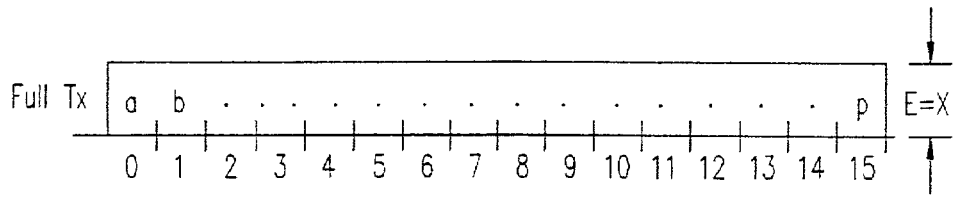
FIGS. 1A to 1D are transmission timing diagrams applied to a forward link or channel of a variable rate CDMA system.
Figure 1B:
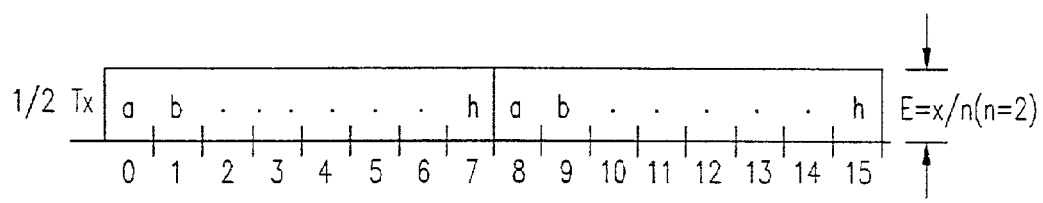
Figure 1C:
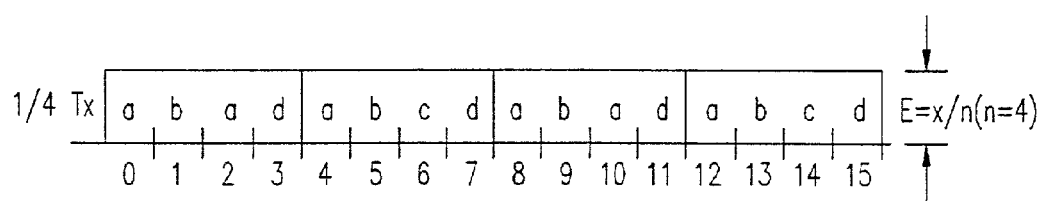
Figure 1D:
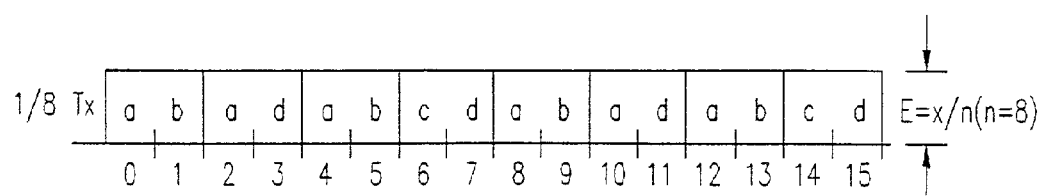
Figure 2A:
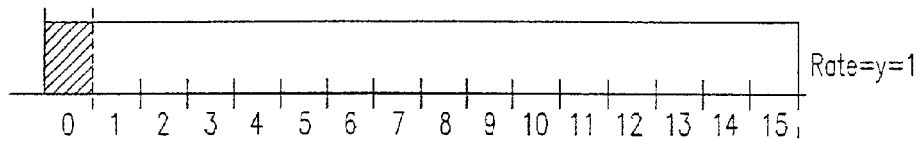
FIGS. 2A to 2D are transmission timing diagrams applied to a reverse link or channel of a variable rate CDMA system.
Figure 2B:
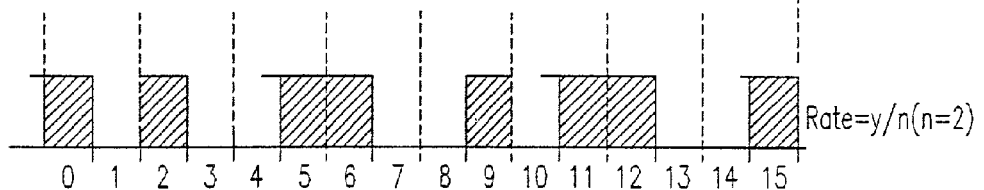
Figure 2C:
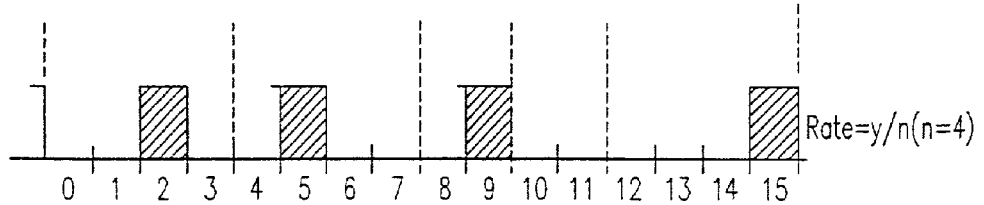
Figure 2D:
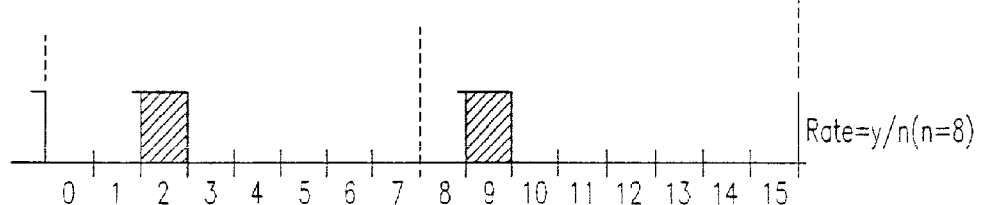

As shown in FIGS. 1B and 1C illustrating respective transmission timing diagrams for the half rate and quarter rate in the conventional method, data of the half rate and the quarter rate are, respectively, repeated in two subframe units and in our subframe units, and the transmission symbol energy is controlled by dividing the full rate symbol energy by the repeat times. As shown in FIGS. 4C and 4E, the repeat times of the subframe is not set to a result obtained by dividing full rate into sub rate, and the symbol energy of the transmitting period is set to a result obtained by dividing the full rate symbol energy into the subframe repeat times, while reducing or removing the repeat times.

As shown in FIG. 1C, the transmission is made through the four times repetition with symbol energy of x/4 in the conventional method. In the preferred embodiment, the transmission at ¼ rate is made through the two times repetition with symbol energy of x/2 (FIG. 4C), or is made without repetition with symbol energy x (FIG. 4E) by the digital modulator 202. If the transmission is made without reduction of the repeat times of the subframe or without the repetition as mentioned above, a period where the signal is not transmitted can be made within the frame.

The gain control element 203 reconstructs the modulated frame as the transmission frame by inserting the non-transmitting period including a terminal searching period into the modulated frame. The gain control element 203 can be located after the digital modulator 202 as shown in FIG. 3, or into the digital modulator 202 e.g., before baseband filtering of the digital modulator.

If the transmission signal processed in the above-mentioned method is transmitted by the RF transmitter 201, the RF receiver 102 of the receiving portion 100 receives the radio signal. Thereafter, the digital demodulator 101 demodulates the radio signal into the signal, as shown in FIGS. 4C and 4E. The mobile terminal varies a frequency of the frequency synthesizer 103 during the period where the signal is not transmitted in the frame (hereinafter, which is referred to a frequency searching period), and then searches the base station signal of the different frequency, thereby being capable of performing the inter-frequency mobile-assisted handoff.

However, the mobile terminal does not know the time and period or a frequency searching period. This problem can be solved by sending information indicating the time when the frequency searching period is generated from the base station to the mobile terminal. The frequency searching period may periodically be generated in a discontinuous form, and/or may be periodically or continuously during a given period.

On the other hand, in case of FIG. 4A, since the frequency searching period can not be made for the full rate, the frequency searching period can be inserted by limiting the encoding rate of a source such as a vocoder, if needed. Substantially, the CDMA cellular telephone system applies a rate limitation which properly limits the encoding rate of the vocoder for inserting signaling data into the voice frame during the communication, and the degradation of the voice quality due to this is negligible.

As the above-mentioned transmitting method is applied to the reverse link transmitted from the terminal to the base station, the terminal may use an empty period to transmit the synchronization signal of the different frequency. Accordingly, the base station of the different frequency can previously be synchronized with the mobile terminal for the handoff.

A starting position of the transmitted symbols may be randomized by a mobile specific predetermined random code, i.e., user long code in IS-95 CDMA system, to minimize interference between terminals different from each other. For intensive frequency scanning and synchronization signal transmission, non-transmitting period can be assigned for successive frames of some interval. For 1/n (n=2,4,8) length successive transmission, the starting position of the transmitted symbols are staggered by 1/n frame time in each frame, for instance 20 frame. If there is no part of the frame to be staggered, the starting position is the beginning of the frame. Such implementation minimizes guard time overhead for frequency switching and resynchronization.

As shown in FIGS. 5A to 5H illustrating the position assignment of successive frequency searching period, the frequency searching period is enlarged as the length of the frame by modularly increasing the starting point of the frequency searching period in the successive frame in a length unit of the transmitting period. For example, in case of the quarter rate without repetition (FIGS. 5E and 5F), the starting point of the frequency searching period of the present frame is the first period in four transmitting periods, is allocated to the second transmitting period in the next frame. Further, the starting point of the Frequency searching period is allocated differently and randomly for respective mobile terminals, thereby being capable of statistically distributing the interference between the mobile terminals.

As shown in FIGS. 5A to 5G illustrating other position assignment, each starting position of transmission symbols during successive frequency searching period is alternately changed to the front part and the rear part of the frame to maximize frequency searching period. This assignment is suitable for the CDMA system that uses various offsets for the frame boundary for each mobile terminals.

As discussed previously, a method for providing inter-frequency handoff in the CDMA cellular telephone system of the present invention has an effect capable of maintaining high communication quality by rapidly establishing an inter-frequency handoff as the mobile terminal searches a frequency of the different base station.

The method in accordance with the preferred embodiment fully enhances inter-frequency handoff capability of TIA/EIA/IS-95 compatible system with minimum changes of the physical layer, e.g., there is no need for channel structure modifications. There is no perceptible voice quality degradation even in the worst case scenario that requires intensive frequency scanning. Moreover, power control and time tracking are well maintained, compared to discarding of an entire frame for inter-frequency handoff.

It will be apparent to those skilled in the art that various modifications and variations can be made in a method and system for providing an inter-frequency handoff in a code division multiple access cellular telephone system of the present invention without departing from the spirit or scope of the invention. Thus, it is intended that the present invention cover the modifications and variations of this invention provided they come within the scope of the appended claims and their equivalents.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method of performing a handoff in a mobile communication system, comprising:
    modulating data of a non-full rate frame having at least one repeated symbol by a first base station at a prescribed energy transmission level;
    generating a searching period by reducing a number of repeated symbols while maintaining the prescribed energy transmission level by increasing an average symbol energy level in a forward link; and
    searching frequency information of at least one second base station by a mobile terminal during the searching period to perform a handoff.

2. The method of claim 1, wherein the base station controls the power level of the non-full rate frame of the forward link prior to generating the searching period.

3. The method of claim 1, wherein the base station increases the forward link power of the non-full rate frame prior to generating the searching period.

4. The method of claim 3, wherein the average symbol energy during the non-full rate frame is increased prior to generating the searching period.

5. The method of claim 1, wherein said modulating step further comprises controlling an energy per modulation symbol.

6. The method of claim 5, wherein the energy per modulation symbol is increased.

7. The method of claim 5, wherein the modulating step further comprises controlling a position of the symbol.

8. The method of claim 7, further comprising controlling a form of a transmitting period with a variable rate characteristic of the transmission frame.

9. The method of claim 8, wherein said modulating step further comprises controlling an energy per information bit of the symbol.

10. The method of claim 1, wherein said modulating step further comprises controlling a position of the symbol.

11. The method of claim 1, further comprising controlling a form of a transmitting period with a variable rate characteristic of the transmission frame.

12. The method of claim 1, wherein the repeat time is an integer number of repetitions.

13. The method of claim 1, wherein the modulated data is non-compressed.

14. The method of claim 1, wherein a transmission length of the frame is shortened from a first length by reducing the number of symbol repetitions and wherein the inserted search period reconstructs the frame to the first length.

15. The method of claim 1, wherein the at least one repeated symbol is identical to at least one other transmitted symbol.

16. A method for providing a handoff in a mobile communication system, comprising:
    modulating data by a base station into a non-full rate frame having at least one repeated symbol period by controlling an energy transmission level;
    forming a non-transmitting period within the modulated frame at the base station by reducing a number of repeated symbols and increasing an average symbol energy during the modulated frame; and
    searching frequency information of a peripheral base station during the non-transmitting period to perform a handoff and transmitting the searched information to a transmitter of the base station.

17. The method of claim 16, wherein modulating data further comprises increasing an average symbol energy within the modulated frame prior to forming the non-transmitting period.

18. The method of claim 16, wherein the energy transmission level is controlled on the forward link prior to forming the non-transmitting period.

19. The method of claim 16, wherein a non-transmitting period is inserted into the transmission frame by controlling the number of repeated symbols based on the transmission symbol energy.

20. The method of claim 16, wherein said non-transmitting period of said transmission frame is inserted in a random pattern through a variable rate limitation method.

21. The method of claim 20, wherein said random pattern is any one of a half rate, a quarter rate, and an eighth rate.

22. The method of claim 16, wherein said non-transmitting period of said transmission frame is a frequency searching period.

23. The method of claim 22, wherein a starting point of said frequency searching period is modularly increased in a length unit of a transmitting period.

24. The method of claim 22, wherein a starting point of said frequency searching period is alternately changed to a front part and a rear part of a frame to maximize the frequency searching period.

25. The method of claim 16, wherein the non-transmitting period is formed based on a form of a transmitting period with a variable rate characteristic.

26. The method of claim 16, wherein the number of repetitions is an integer.

27. A method for providing a handoff in a mobile communication system, comprising:
    controlling an energy level of symbols in a non-full rate transmission frame on a forward link at a first base station;
    generating a non-transmitting period in the frame of the first base station by reducing a number of repetitions of a transmission symbol in a pre-transmission frame and at least one of a position and form of a transmitting period; and searching a second base station signal of a different frequency during the non-transmitting period by a mobile station that has received the transmission frame.

28. The method of claim 27, wherein controlling the energy level comprises increasing an average symbol energy within the frame prior to forming the non-transmitting period.

29. The method of claim 27, wherein said non-transmitting period of said transmission frame is a frequency searching period.

30. The method of claim 27, wherein the mobile station transmits a signal to the second base station to perform the search for the second base station.

31. The method of claim 27, wherein the number of repetitions is an integer.

32. The method of claim 27, wherein the transmission frame has the same energy level as the pre-transmission frame.

33. The method of claim 27, wherein data comprising the frame is limited to non-compressed data.

34. A mobile communication system, comprising:
a base station configured to modulate data into a non-full rate transmission frame having at least one repeated symbol and a prescribed transmission energy level, said base station forming a non-transmitting searching period by reducing a number of repetitions and controlling the prescribed transmission energy level; and
a terminal configured to search frequency information during the non-transmitting searching period for performing an inter-frequency handoff and to transmit the searched frequency information to said base station.

35. The system of claim 34, wherein controlling the energy level comprises increasing an average symbol energy within the frame prior to forming the non-transmitting period.

36. The telephone system of claim 34, wherein said base station comprises:
a modulator that modulates the data to the prescribed energy level of the transmission frame;
a gain control element that inserts the non-transmitting period into the transmission frame; and
a transmitter coupled to said gain controller to transmit the transmission frame.

37. The system of claim 34, wherein said terminal comprises:

a receiver that receives the transmission frame;
a demodulator coupled to demodulate the received transmission frame; and
a frequency synthesizer that varies a frequency during the non-transmitting period and searches the frequency information of a peripheral base station having a different frequency to perform a handoff.

38. The system of claim 34, wherein the number of repetitions is an integer.

39. The system of claim 34, wherein the prescribed transmission energy is determined based on an inverse proportion of a number of repetitions of a transmission symbol, and at least one of a position and form of a transmitting period with a variable rate characteristic of the transmission frame.

40. A method of performing a handoff in a mobile communication system, comprising:
modulating data of a non-full rate frame having at least one repeated symbol by a first base station at prescribed energy transmission level;
generating a searching period by reducing a portion of the non-full rate frame while maintaining the prescribed energy transmission level by increasing an average symbol energy during the modulated frame in a forward link; and
searching frequency information of at least one second base station by a mobile terminal during the searching period to perform a handoff.

41. A method of performing a handoff in a mobile communication system, comprising:
modulating data of a non-full rate frame having at least one repeated symbol at a prescribed energy transmission level;
generating a searching period by non-transmitting a portion of the non-full rate frame while maintaining the prescribed energy transmission level by increasing an average symbol energy during the modulated frame; and
searching frequency information of at least one second base station during the searching period to perform a handoff.

* * * * *